C. E. ROSS.
BRICK HANDLING MACHINERY.
APPLICATION FILED MAY 31, 1918.

1,325,864.

Patented Dec. 23, 1919.

Witness
H. S. McDowell

Inventor
C. E. Ross
By C. C. Shepherd
Attorney

UNITED STATES PATENT OFFICE.

CHARLES E. ROSS, OF COLUMBUS, OHIO.

BRICK-HANDLING MACHINERY.

1,325,864.  Specification of Letters Patent.  Patented Dec. 23, 1919.

Application filed May 31, 1918. Serial No. 237,411.

*To all whom it may concern:*

Be it known that I, CHARLES E. ROSS, a citizen of the United States, residing at Columbus, in the county of Franklin and State of Ohio, have invented certain new and useful Improvements in Brick-Handling Machinery, of which the following is a specification.

This invention relates to brick handling machinery, useful particularly in the manufacture of bricks, and with regard to the more specific aspects of the invention, the latter has for its object to provide machinery or means whereby the manual handling of brick is practically eliminated, and to thereby cheapen the process of brick manufacture and to prevent the great waste which occurs when the bricks are manually handled.

To this end, the invention has for another object to provide truck means for transporting bricks into a kiln, to deposit the same therein, wherein they are baked or fired, and to finally effect the removal of said bricks from the kiln by virtue of the truck means and whereby all these operations are capable of being carried out without in any way manually handling the bricks.

Another object of the invention resides in the novel form of pallet structure, which is capable of being built up in separable sections and may be formed to provide any suitable number of tiers or brick compartments, the sections of the pallet structure being identical in construction so that the same are readily interchangeable and are capable of being built up one upon the other to form the composite pallet structure.

A further object of the invention resides in the provision of a foundation located in the kiln for the reception of the pallet structure, and which foundation is of such construction as to permit a truck of novel formation to be readily associated therewith for the purpose of depositing the pallet structure upon said foundation, this truck being formed to provide a bifurcated end, which end is adapted to substantially surround the foundation, and to further form the truck with a vertically movable frame, capable of supporting the pallet structure, whereby when the frame is raised or lowered, the pallet structure may be removed from or deposited upon said foundation.

The preferred embodiment of my invention is shown in the accompanying sheet of drawing, in which similar characters of reference designate corresponding parts, and in which.

Figure 1:
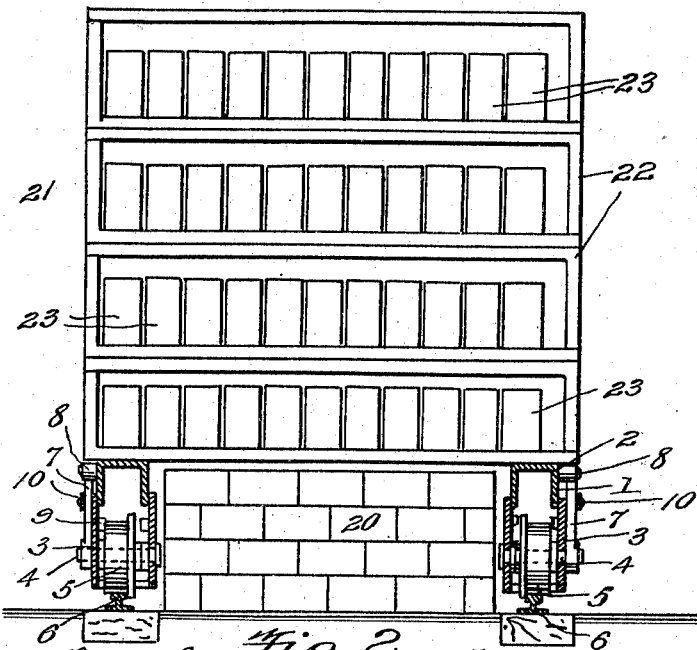
Figure 1 is a vertical transverse sectional view taken through the truck mechanism employed by the invention, and disclosing the pallet structure and kiln foundation in operative association therewith.

This invention forms an improvement upon the structure disclosed in my co-pending application, filed May 18, 1917, bearing Serial Number 169,418, the object of the present invention being to provide means whereby when the pallet structure is deposited within the kiln for purposes of brick firing, the said structure will be prevented from bowing, bending or otherwise assuming inoperative shapes under the influence of kiln heat. In my aforesaid co-pending application, the pallet structure is so formed as to be supported contiguous to its ends, whereby when the several platforms thereof are subjected to kiln heat, the same are likely to bend contiguous to their medial portions, this is caused primarily by the weight of bricks deposited upon said platforms when taken in conjunction with a malleable effect of kiln heat, thereby causing the bricks to come into physical contact with each other, so that certain of their faces will not directly receive the benefits derived and the intended action of the kiln heat.

In order to overcome the above disadvantages, and others, the present invention consists of a truck member 1 which in its preferred form embraces a U shaped vertically movable channel member 2 and a pair of spaced wheel frames 3. These frames carry a plurality of spaced stud axles 4, which rotatably carry wheels 5, said wheels being adapted to run over a suitable trackway 6. Pivotally mounted upon the ends of certain or all of the stud axles 4 are a plurality of cam members 7 which at their upper ends are adapted to engage with rollers or other similar devices 8 carried by the channel member 2, whereby upon the oscillation of the cam members, said channel member may be raised or lowered for purpose to be hereinafter set forth. When in its lowered position, the weight of the channel member is supported by fixed shoulders or other similar abutments 9 extending between the sides of the frames 3.

To effect the oscillation of these cam members, the latter are connected for uniform movement by means of a plurality of spaced side links 10, which links are connected at their forward ends with a transversely extending cross bar 11. The bar 11, in turn, is suitably connected with a longitudinally extending rack bar 12 mounted for reciprocation within suitable guides 13, the teeth of the rack bar being adapted to mesh with the pinion 14 fixedly carried by the transversely extending shaft 15. This shaft is rotated by means of a worm gear 16 which is keyed or otherwise secured to said shaft 15 and this gear meshes with a worm screw 17 carried upon a longitudinally extending operating shaft 18, the end of this latter shaft being equipped with a rotating handle 19.

From the foregoing it will be seen that by rotating the shaft 18, motion will be imparted to the cross shaft 15 by virtue of the gears 16 and 17. This results in the rotation of the pinion 14 and the consequent reciprocal movement of the rack bar 12, thus effecting the sliding movement of the cross bar 11 and its associated links 10. The links in turn impart adjusted movement to the cam members 7, whereby the channel member 2 may be raised or lowered.

Figure 2:
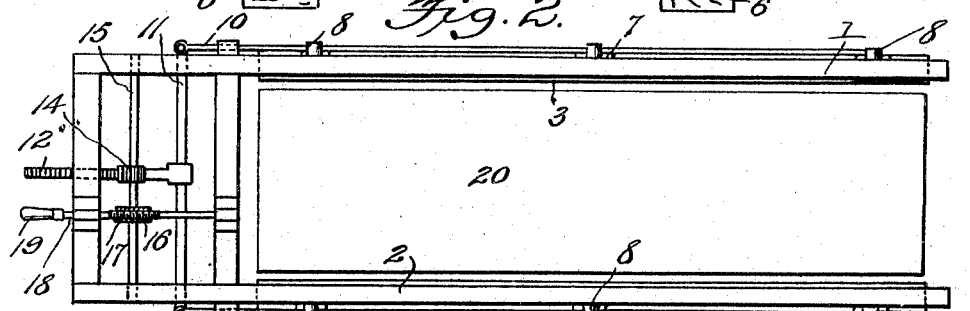
Fig. 2 is a top plan view of the truck and foundation, the pallet structure being removed to disclose the truck structure.
Figure 3:
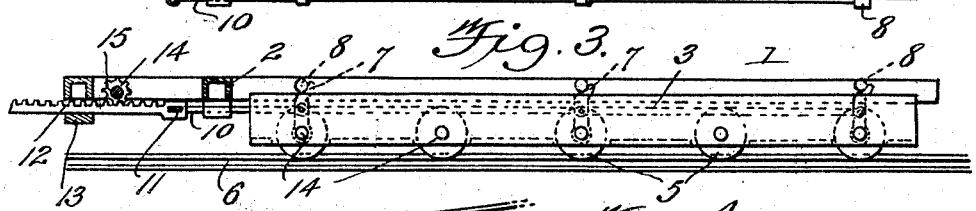
Fig. 3 is a vertical longitudinal sectional view taken through the truck.
Figure 4:
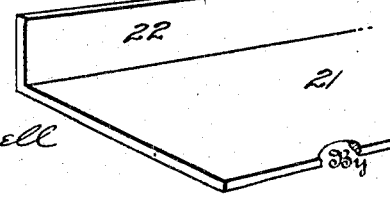
Fig. 4 is a fragmentary perspective view of one of the pallet members.

This raising and lowering movement of the member 2 is of advantage in depositing in and removing brick from a kiln. This is shown particularly clear in Fig. 1. Mounted at any suitable position within said kiln is a substantially oblong foundation 20 which is so constructed as to permit the bifurcated end of the truck member to be positioned on opposite sides thereof, as shown in Figs. 1 and 2, whereby a pallet structure 21 may be deposited on or removed from engagement with said foundation. This pallet structure consists of a plurality of substantially L shaped sections 22 which are preferably formed from a refractory material such as brick clay for example. The elongated portions of the pallet structure 22 are adapted to be situated transversely of the truck 1 and are so constructed that the lower section will engage with the upper supporting surface of the member 2, whereby the entire weight of the pallet structure may be supported by said truck. In practice, these sections 22 are built up one upon the other substantially in the manner shown in Fig. 1, so that any desired number of bricks may be placed upon the truck to be supported and transported thereby, and it will be further noted that the sections are of an interchangeable character whereby undue care is not necessary in effecting their assembly. The bricks 23 are placed upon the sections in the manner shown, whereby each face thereof will be separate from adjoining brick faces in order to permit of an efficient circulation of the kiln heat therebetween and to expeditiously promote their hardening or baking. By forming the sections from a refractory material, the faces of the brick which engage therewith will also receive the benefit of the kiln heat.

From the foregoing description, taken in connection with the accompanying drawing, it will be apparent that I have provided mechanism wherein the manual handling of bricks is reduced to the minimum. After the bricks leave a cutting machine (not shown), they are placed upon the pallet sections 21, and these sections are mounted upon the truck 1 in the manner shown, which sections are so formed that they may be arranged in superposed relation without bringing the bricks into contact with each other. In this loaded condition, the truck is pushed or otherwise conveyed to the kiln, and the assemblage of bricks and pallet sections are deposited upon the foundation 20, so that the lower-most section rests directly upon the relatively broad upper face of said foundation. It will be observed that owing to the width of the foundation, the pallet structure will be securely supported and all strain and stress entirely removed therefrom. The shorter vertically extending portions of each section form substantially solid vertical side walls, which materially increase the strength of the pallet structure and effectually prevent the latter from bending or warping when subjected to heat and weight. After the kiln has been thus filled, the bricks are burned and the truck again run into position beneath the assemblage of pallets and bricks and by operating the elevating mechanism of the truck, said assemblage is removed from engagement with the foundation and may be thus transported to any suitable position of removal.

I claim:

In mechanism of the class described, the combination with a hoisting truck having an open end portion, a permanent foundation capable of being positioned between said open end portion, a pallet structure carried by said hoisting truck and capable of being transferred from the latter to said foundation, and said pallet structure including a plurality of superimposed, interchangeable L shaped sections.

In testimony whereof I affix my signature.

CHARLES E. ROSS.